United States Patent [19]

Koetser

[11] Patent Number: 4,583,814
[45] Date of Patent: Apr. 22, 1986

[54] INFRA-RED OPTICAL SYSTEMS

[75] Inventor: Adrian H. Koetser, Brentwood, England

[73] Assignee: GEC Avionics Limited, Rochester, England

[21] Appl. No.: 630,785

[22] Filed: Jul. 13, 1984

[51] Int. Cl.[4] .......................... G02B 23/00; G01K 1/20
[52] U.S. Cl. ...................................... 350/1.2; 350/588;
374/141; 374/161; 374/191
[58] Field of Search ................. 350/1.2, 1.3, 1.4, 588;
374/141, 142, 147, 148, 161, 191

[56] References Cited

U.S. PATENT DOCUMENTS 2,963,910 12/1960 Astheimer ........................... 374/141

FOREIGN PATENT DOCUMENTS 174275 9/1916 Canada ................................ 350/588

Primary Examiner—Bruce Y. Arnold
Assistant Examiner—William Propp
Attorney, Agent, or Firm—Spencer & Frank

[57] ABSTRACT

The system relates to a telescope having optics and a scanning head which images a two-dimensional field of view point by point onto a localized thermal sensor. An aperture stop is mounted within the telescope housing and at least part of it is within the field of view of the sensor. The temperature of the stop is controlled by means of Peltier thermo-electric modules so that it corresponds to the average temperature of the external field of view. This prevents halation or blooming which would result from extreme temperature contrasts. The vignetting which occurs when the aperture stop is within the field of view gives an increased magnification for a given size of objective optics, and the benefits outweigh the corresponding reduction in thermal sensitivity.

7 Claims, 1 Drawing Figure

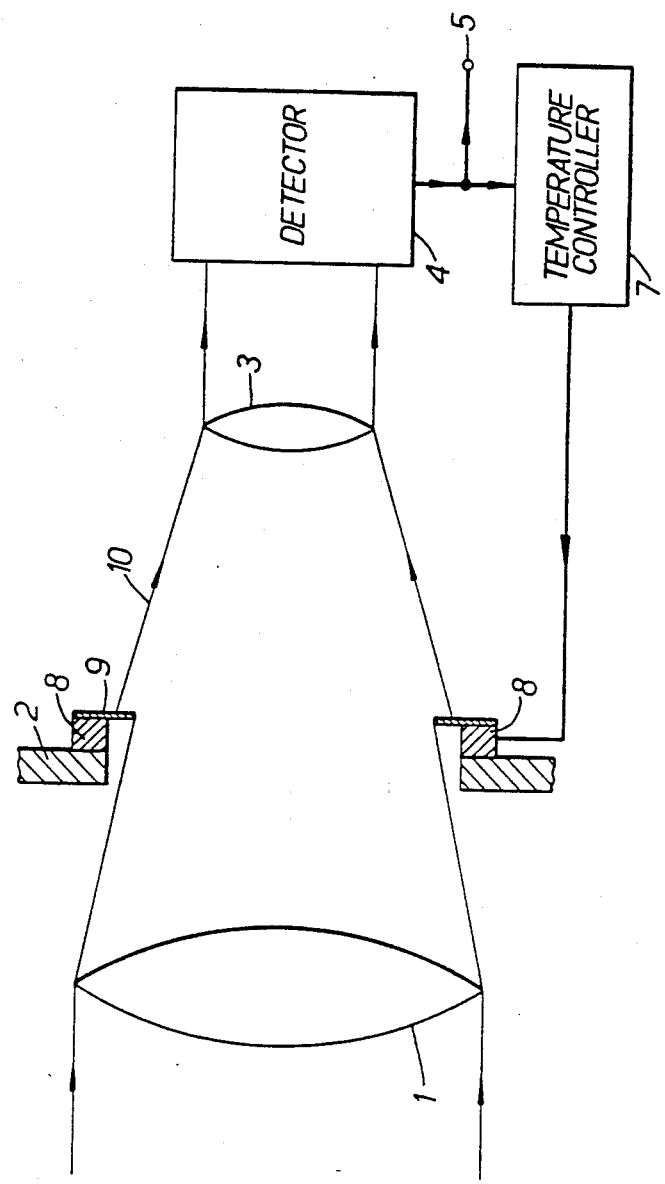

INFRA-RED OPTICAL SYSTEMS

This invention relates to an infra-red optical system which incorporates an optical arrangement which forms an image on a thermal sensor. The two principal parameters that determine the performance of a thermal imaging system are the thermal sensitivity and the angular resolution, and these two parameters are dependent on the entrance pupil area of the optics and the optical magnification respectively. In optical systems which operate in the visible portion of the spectrum the design is usually arranged so as to avoid the effect of vignetting, as this manifests itself as a peripheral shading of the field of view, and is caused by a pupil size restriction somewhere in the body of the optics, usually at the entrance aperture. For example, the restriction can be caused by an under-sized objective lens.

Vignetting has previously been regarded as being a very undesirable property of an infra-red optical system, but the present invention seeks to provide an improved infra-red optical system which uses vignetting to advantage.

According to this invention, an infra-red optical system includes optical means for imaging a field of view on to a thermal sensor, the perimeter of the field of view being defined by an aperture stop located within the system and at least part of which is within said field of view; and means for controlling the temperature of the aperture stop in dependence on the temperature of the field of view.

If the aperture stop forms part of a large structure, or is thermally attached to a housing within which the optical system is mounted, only those parts of the aperture stop which are imaged on to the thermal sensor need be temperature controlled. Conveniently, temperature of the aperture stop is adjusted to the mean or average temperature of the field of view.

It has been found that under some circumstances vignetting of the field of view of a thermal imaging system can present distinct advantages, and the use of a temperature controlled aperture stop avoids the introduction of extreme temperature contrasts within the field of view which could otherwise lead to blooming or halation.

The invention is further described by way of example with reference to the accompanying drawing which illustrates in diagramatic fashion an infra-red telescope.

Referring to the drawing, radiation from an external field of view is incident upon an objective lens 1 which forms part of a telescope system, part of the housing of which is represented diagramatically by the structure 2. The incident radiation is collected by a further lens 3 which represents the input pupil of a thermal detector 4. In practice, the detector 4 includes a scanning head by means of which the telescope is caused to scan across a field of view in a series of narrow line scans after the manner of a television raster pattern so that the incident thermal radiation is caused to fall upon a localised thermal sensor. Thus the scanning head in effect scans each point within a two-dimensional field of view on a sequential basis.

The aperture stop of the telescope is determined by the diameter of a hole in an annular plate 9 which is positioned between the two lens 1 and 3. The inner rim of the plate is within the field of view of the scanning head of the detector 4, and hence the plate 9 causes vignetting. Whereas the vignetting of the optical system can result merely in a thin uniform peripheral shading of the field of view whilst the detector 4 is viewing an axial position of the field of view, the peripheral shading can become quite marked for off-axial positions. Thus when the detector is viewing the edges of the field of view at the scan extremities, the scanner pupil is filled by an increasing proportion of radiation originating from the interior of the telescope body. It has been found that if this is at a very different temperature to the average scene temperature, then there will either be a peripheral halo or shading of the image which can cause severe degradation of the resolution and image quality of the signal generated by the thermal sensor.

In order to overcome this difficulty the output of the detector 4, which is a video signal representative of the image detail (i.e. the temperature variations), is fed not only to an output terminal 5 at which the information is utilised as required, but is also fed to a temperature controller 7. The controller 7 derives from the applied video signal a control signal representative of the average temperature of the field of view. The output of the temperature controller 7 is fed to a number of separate thermo-electric modules 8 which are mounted around the circumference of the plate 9. The plate 9 is made of a material having a good thermal conductivity, but is thin so that it has a low thermal mass. One surface of each module is attached to the housing 2 of the telescope and the other surface is attached to the thin plate 9. By applying a control voltage to each module 8, a controlled temperature difference can be established between the plate 9 and the housing 2. Modules of this kind are well known and are often called Peltier devices. Thus, the temperature of the plate 9 can be accurately controlled, and in practice it can be made either hotter or colder than the telescope housing, which typically represents the ambient temperature within which the telescope is being operated. The temperature controlled parts of the plate 9 are within the field of view of the detector 4. The use of the module 8 avoids the introduction of great temperature ranges into the field of view. It enables the dynamic range of the detector 4, and any subsequent signal processing to be kept to a reasonable level, and avoids the introduction of halation or blooming which would otherwise result if the field of view contained extreme temperature contrasts.

It has been found that when the telescope magnification is increased above the usual value so that some degree of vignetting is introduced, as is indicated by the rays 10 in the drawing, the reduction in thermal sensitivity resulting from the vignetting of the scanner pupil by the plate 9 is more than compensated by the resulting gain in angular resolution. Thus the introduction of a certain amount of vignetting increases the overall performance of the telescope, but without the need to make a corresponding increase in the size or diameter of the telescope itself.

I claim:

1. An infra-red optical system including optical means for imaging a field of view onto a thermal sensor, the perimeter of the field of view being defined by an aperture stop located within the system and at least part of which is within said field of view; and means for controlling the temperature of the aperture stop in dependence on the temperature of the field of view.

2. A system as claimed in claim 1 and wherein means are provided for adjusting the temperature of the aperture stop so as to be intermediate the warmest and coolest portions of the external field of view.

3. A system as claimed in claim 1 and wherein portions of the field of view are sequentially imaged on to the thermal sensor by means of a scanning head.

4. A system as claimed in claim 1, and wherein the aperture stop is located between an objective lens forming part of a telescope and a further lens which defines the entrance pupil of the thermal sensor.

5. A system as claimed in claim 1 and wherein the aperture stop is composed of a material having a good thermal conductivity and a low thermal mass.

6. A system as claimed in claim 1 and wherein the temperature of the aperture stop is determined ty means of a Peltier thermo-electric module which is mounted in thermal contact with it.

7. A system as claimed in claim 6 and wherein a plurality of discrete modules are positioned around the periphery of the aperture stop in contact with a body having a relatively large thermal mass.

* * * * *

UNITED STATES PATENT AND TRADEMARK OFFICE
CERTIFICATE OF CORRECTION

PATENT NO. : 4,583,814

DATED : April 22nd, 1986

INVENTOR(S) : Adrian Harry Koetser

It is certified that error appears in the above-identified patent and that said Letters Patent is hereby corrected as shown below:

In the heading of the patent, insert --[30] Foreign Application Priority Data July 20, 1983 [GB] United Kingdom 8319560--

Signed and Sealed this

Fifth Day of August 1986

[SEAL]

Attest:

DONALD J. QUIGG

Attesting Officer     Commissioner of Patents and Trademarks